Oct. 4, 1932.　　H. L. GRIGGS ET AL　　1,880,247
DOUBLE JET CONTROLLER DEVICE
Filed Dec. 6, 1930　　2 Sheets-Sheet 1
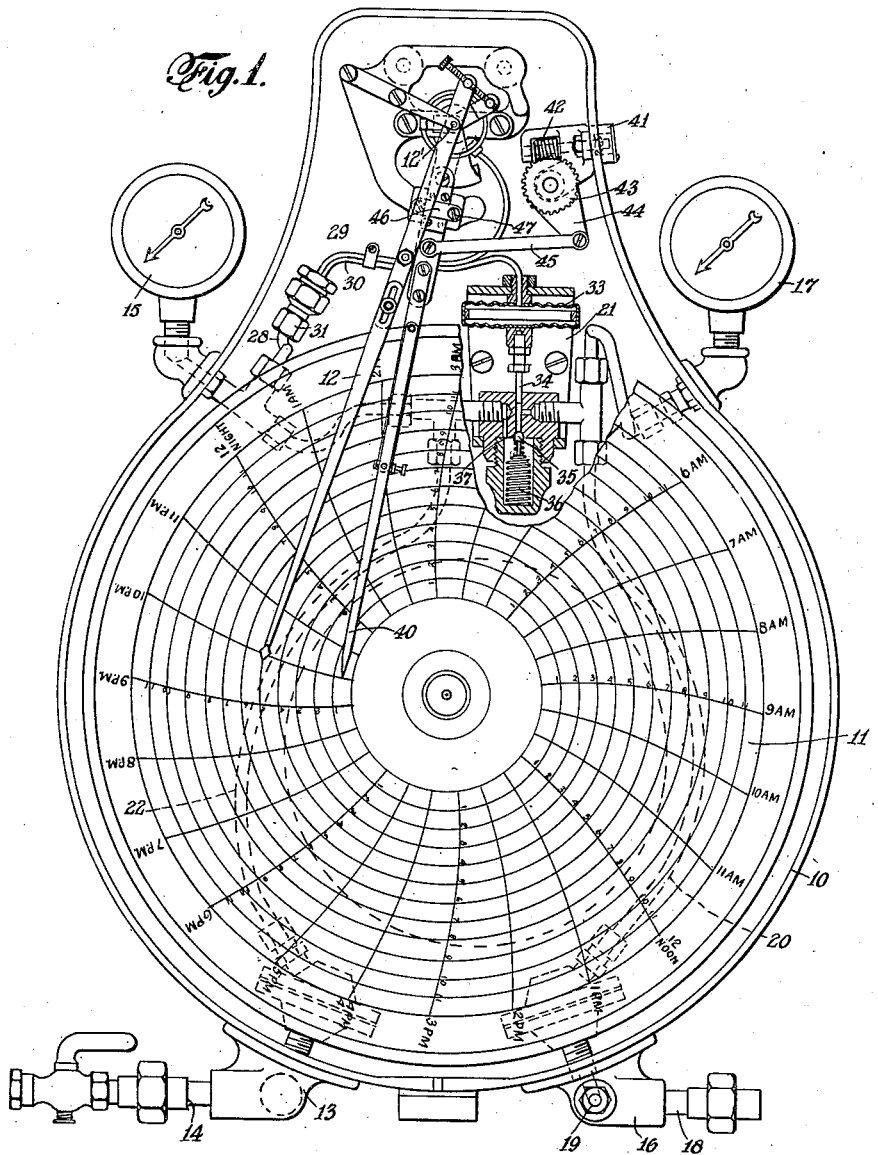
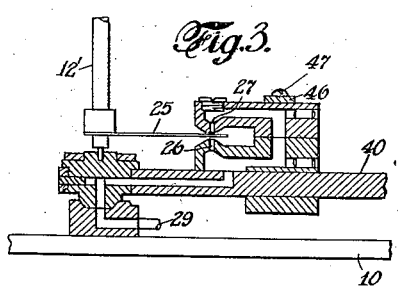
INVENTORS
HENRY L. GRIGGS and ARTHUR R. MABEY
BY
ATTORNEY Oct. 4, 1932.                H. L. GRIGGS ET AL                1,880,247
                          DOUBLE JET CONTROLLER DEVICE
                             Filed Dec. 6, 1930          2 Sheets-Sheet 2
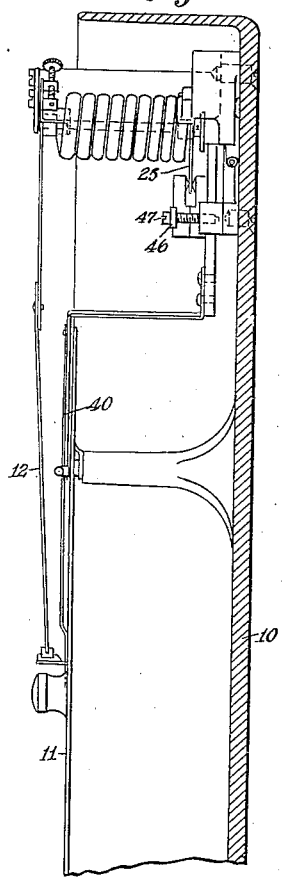
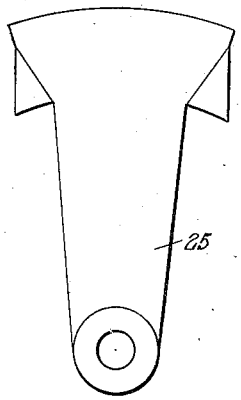
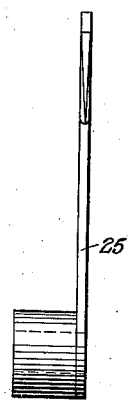
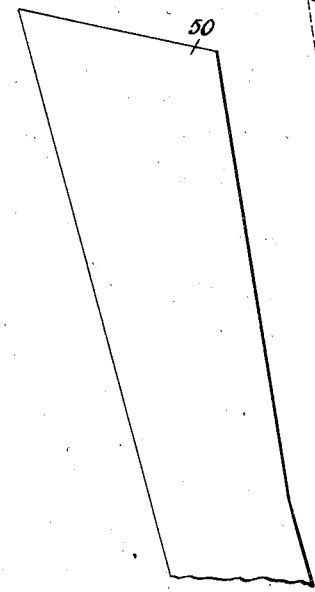
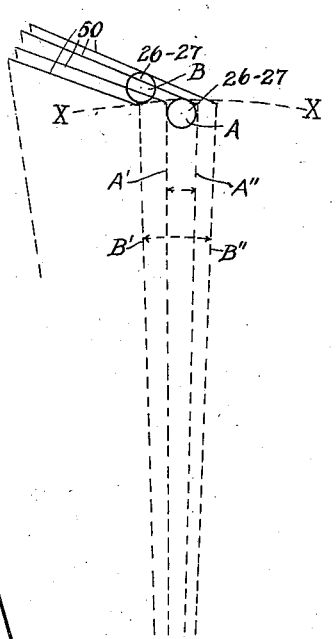
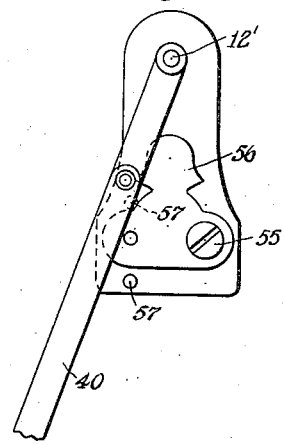
INVENTORS
HENRY L. GRIGGS and ARTHUR R. MABEY
BY
ATTORNEY Patented Oct. 4, 1932

1,880,247

UNITED STATES PATENT OFFICE

HENRY L. GRIGGS AND ARTHUR R. MABEY, OF WATERBURY, CONNECTICUT, ASSIGNORS TO THE BRISTOL COMPANY, OF WATERBURY, CONNECTICUT, A CORPORATION OF CONNECTICUT

DOUBLE-JET CONTROLLER DEVICE

Application filed December 6, 1930. Serial No. 500,565.

The invention relates to apparatus for automatically controlling the passage of fluid through a conduit, which fluid may either directly affect the conditions under final control, or may regulate the same through intermediate mechanisms. For example, it may bring into action a supply of a heating medium.

In apparatus of this character, it has been proposed to associate with a device responsive to changes in temperature, pressure, etc., a control element such as a valve member which is operable thereby and is of the nature of a more or less flat resilient element adapted to cooperate with a port to change the effective pressure of a stream of fluid, the fluid in turn effecting the control and regulation desired, as through a so-called "servomotor" device.

The present invention has for an object a novel controlling element for association with a responsive device, and the particular arrangement thereof for effecting the desired control; also, to provide for an element of this nature whereby the speed at which the control is to be effected may be regulated, more especially as applied in a "floating" control system.

In carrying out the invention, a diaphragm-actuated pilot means, for example, is arranged to have its diaphragm subjected to a variable fluid pressure, a valve of said means opening and closing in accordance with the degree of pressure applied to the diaphragm. The variable fluid pressure applied to this diaphragm is subject to the action of a responsive device under the influence of pressure, temperature or like conditions, the said responsive device for this purpose having associated with it a vane member movable thereby between two opposed fluid discharging nozzles which are adapted to discharge fluid against opposite sides of the vane member acting as a shutter or gate when brought into juxtaposition with the said opposed nozzles.

A "servo-motor" or like device may, in turn, be operated by fluid whose pressure and supply is under the control of the said vane through the pilot valve. The said oscillatable vane, moreover, may be variously designed to effect different degrees of throttling as it registers more or less with the two opposed nozzles.

The nature of the invention, however, will best be understood when described in connection with the accompanying drawings, in which:

Fig. 1 is a front elevation of the novel control apparatus, with a portion of the casing and record chart broken away.

Fig. 2 is a fragmentary vertical section through the casing and on an enlarged scale.

Fig. 3 is a fragmentary longitudinal section, on an enlarged scale, of the vane and associated nozzles.

Fig. 4 is a front elevation and Fig. 5 a side elevation, on an enlarged scale, of the oscillatable vane.

Figs. 6 and 7 illustrate, on an enlarged scale, a modification in the design of the oscillatable vane of the control device, and the action thereof.

Fig. 8 is a fragmentary plan view of a modified nozzle mounting.

Referring to the drawings, 10 designates a suitable casing for housing a recording instrument embodying a rotatable chart 11 and a pointer or recording stylus 12 which latter may be actuated by temperature, pressure or other conditions and be moved over the chart in accordance with variations in such conditions, and as is well understood.

At the bottom of the casing 10 there is attached a fitting 13 to which is connected an inlet pipe 14 from a source of fluid supply (not shown) and under the desired pressure; and a pressure gauge 15 may also be connected with said fitting to indicate the particular supply pressure prevailing.

A further fitting 16 is attached to the bottom of the casing and is likewise connected with a gauge 17 and has an outlet 18 for supplying fluid under pressure to a servo-motor (not shown) and of any well-known or special construction.

A bleeder connection 19 is provided in the fitting 16 and is of such dimensions relatively to the outlet 18 as not appreciably to affect the supply but leaking off the fluid when the supply to the fitting is cut off. A tube 20 connects the fitting 16 with a diaphragm-actuated means or pilot valve 21 which is also in communication through a tube 22 with the fitting 13 and thus with the source of fluid supply.

However, the pilot valve 21 is arranged, under certain conditions, to cut off the supply of fluid to the tube 20 and servo-motor, this being effected in accordance with the movement of the stylus 12 actuated by the conditions to be controlled, in turn, by the servo-motor.

To this end, the stylus arbor 12′ carries a flexible vane 25, Figs. 2 and 3, which is positioned for oscillatory movement between two oppositely disposed fluid-discharging nozzles 26 and 27 which are permanently in communication with the source of fluid supply, as through a tube 28 having the branches 29 and 30—one of which feeds the nozzles 26 and 27, as indicated, and the other of which places the pilot valve permanently in communication with the source of supply.

Normally, the fluid is discharged in two oppositely directed jets from the respective nozzles, the pressure thereof having been substantially reduced by the interposition of a reducing valve or constriction 31 in the tube 28. When stylus 12 moves to position the vane 25 between the two nozzles, said vane being so designed as to fill substantially the space therebetween, the discharge from the respective orifices of the nozzles practically ceases; and a back pressure will be set up in the communicating passageways thereto, particularly in the branch 30 to the pilot valve, which pressure is utilized to operate the said valve.

The connection 30 from the tube 28 is to this end made to the one side of a diaphragm 33 of the said pilot valve 21 which is thus subject to the pressures prevailing in the connection 30 and under the control of the aforesaid vane. Diaphragm 33, moreover, is connected through a stem 34 with a valve 35 which is under mechanical tension, as by means of the spring 36, to be seated thereby normally on a seat 37.

This valve controls the transmission of fluid between the tube 22 and the tube 20 operating, for example, a servo-motor, and when the valve 35 seats no actuating fluid is supplied thereto. When the pressure on the diaphragm builds up, however, under the action of the interposed vane, valve 35 is lifted off its seat 37 and communication is re-established between the tubes 22 and 20 through the pilot valve 21 for operating the servo-motor.

It is, furthermore, desirable to provide for an adjustment by which it is possible to regulate the speed of increase or decrease of the pressure on the servo-motor or relay. In order to secure "floating" control with this type of motor, the speed of its operation must be regulated to suit the speed with which the process responds to changes in degree of opening of the valve supplying an active medium. For example, in instances in which the servo-motor controls a flow of steam, as used for heating and where the process responds rather promptly to the application of the steam, when the apparatus is started cold the servo-motor will provide for a full opening of the steam supply valve, the said valve closing when the temperature reaches the control point or desired degree.

For an "open and shut" control with rapid adjustment of the valve controlling the supply of steam, such valve will remain wide open until the control point is reached, whereupon it closes abruptly. The temperature will then run by the control point to a greater or less degree according to conditions, whereupon cooling will begin. When this cooling has proceeded to the control point, the valve will likewise abruptly cut in the supply, although the temperatures will still continue to drop to an extent depending upon conditions; and when the drop is completed, the rise of temperature will again begin and with valve wide open, completing the cycle which will continue to repeat itself.

However, if the valve be adjusted to open and close gradually, then when the temperature is rising, said valve may be caused to start to close before the control point is reached. Thereupon, when this point is attained, the valve will have substantially the correct opening to maintain the control temperature. Moreover, due to lag, which is unavoidable, there will be a slight rise in temperature above the control point and which, in turn, will cause the valve to remain closed a trifle too long. This will cause the temperature to fall and the valve to open slowly. Similarly, the temperature will fall slightly below the control point before the valve opening can make the necessary correction and again start the temperature to rise. Thus, a cycle is completed which will continue repeating itself; and if the speed of the valve has been properly adjusted, the "swings" in this cycle will gradually shorten so that, if the condition of the process remain fairly constant, a balance may be had where hardly any movement of the valve takes place.

Of course, such floating control cannot be secured under all conditions, particularly where rapid changes of conditions occur. Should the speed of adjustment be too slow, the corrections are made too slowly and the temperature will coast over the control point, causing the temperature record to show a tendency to "wander"; while if the conditions are fairly constant, the temperature record is likely to be of the nature of a regular sine curve.

As shown, a vane may be made symmetrical, if desired, so as to be equally suited for action whether it comes into such action in moving clockwise or counter-clockwise; and may be reduced near the shaft end to render the vane more flexible laterally at the point which passes between the jets so that it will be more or less "floated" between the jets on a film of air.

Two different means are, moreover, indicated for effecting this adjustment of the control, reference being had to Fig. 3; and to Figs. 6 to 8. Provision is made in the former embodiment for making the two fluid-discharging nozzles 26 and 27 adjustable as a unit and radially with respect to the throttling vane 25 which is adapted to oscillate therebetween, as hereinbefore described. This adjustment may be accomplished by slidably mounting the nozzles 26 and 27 on a setting arm 40 which is swingable about the axis of arbor 12', the setting arm in turn being adjustable as a whole, for example, from a knob 41 outside the instrument casing 10 and rotating a worm 42 which meshes with a worm wheel 43 of an arm 44 connected with the setting arm 40 through a link 45. A clamping strap 46 holds the nozzle portion firmly to the setting arm in adjusted position as by means of the screws 47; and the said nozzles may thus be variously located radially relatively to the interposed vane to suit the requirements.

With a vane of the type illustrated in Figs. 6 and 7, having a uniform thickness and inclined cut-off or throttling edge 50, the speed of action depends upon the length of time required for said edge 50 to cover or uncover the nozzle orifices. For purpose of adjustment of the rate of the action between the nozzles and vane, the former are arranged to be moved in the arc of a circle in order that the distance of the jets from the axis of rotation of the vane can be increased or decreased. For example, if the jets are entirely below arc XX, position A, Fig. 7, the miximum speed is obtained due to the fact that the side of the vane, which serves as a throttling edge, moves in a line perpendicular to the throttling edge. When the jet is entirely above arc XX, position B, Fig. 7, the minimum speed is obtained due to the fact that the end of the vane, which serves as a throttling edge moves in a line oblique to the throttling edge. This latter position of the jet represents the position for minimum speed; and the angle between lines B' and B" is the travel required of the vane to completely uncover the jet orifices. The position A represents the position of the jet for maximum speed; and the angle between lines A' and A" is the travel required of the vane to completely uncover the orifice. Position B should be taken so that angle A' A" bisects angle B' B", as by so doing the point of control remains unchanged as the speed is changed.

The distance from A to B is small; and it is immaterial whether the jet travels in a straight line between these two points or whether it moves in the arc of a circle, provided the angle is small. Any speed between the maximum and minimum can be had by selecting the proper intermediate position between A and B.

To effect the rotational movement of the nozzles relatively to a vane of the type illustrated in Figs. 6 and 7, the former may be pivotally mounted, as indicated in Fig. 8, to swing about a stud 55 which serves also to clamp the same to the setting arm 40, an extension 56 of the nozzle element being provided to engage with stop pins 57 projecting from the setting arm to limit the extent of swing possible for adjustment. This effects the desired change in distance of the nozzles from the axis of the vane.

The vane with suitably shaped cut-off edge may thus be arranged to restrict and cut off the flow from the separated and opposed nozzles to afford any desired degree of control action; and the novel construction admits of accomplishing this result without appreciably affecting the movement of the responsive member so that its sensitiveness and accuracy are not impaired, entire freedom of action thereof being allowed beyond the point where maximum throttling occurs.

We claim:

1. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable controlling element freely movable between said nozzles to receive upon its opposite faces fluid jets from the nozzles whereby the forces of said jets upon the element are substantially balanced, and a responsive device oscillating said controlling element between the nozzles to cut off simultaneously thereby the jets of fluid normally discharged therefrom and actuate the pilot valve.

2. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable and flexible controlling element freely movable between said nozzles to receive upon its opposite faces fluid jets from the nozzles whereby the forces of said jets upon the element are substantially balanced, and a responsive device oscillating said controlling element between the nozzles to cut off substantially thereby the jets of fluid normally discharged therefrom and actuate the pilot valve and the element then floating substantially midway of said nozzles.

3. In controlling apparatus for means utilizing a fluid, and a pilot valve to control the supply of fluid to be utilized: means to operate the pilot valve and embodying two separated nozzles directly opposed to each other and permanently in communication with a source of fluid supply and with the pilot valve, an oscillatable and flexible controlling element freely movable between said nozzles to receive upon its opposite faces fluid jets from the nozzles whereby the forces of said jets upon the element are substantially balanced, and a responsive device oscillating said controlling element between the nozzles to cut off substantially thereby the jets of fluid normally discharged therefrom and actuate the pilot valve and the element then floating substantially midway of said nozzles.

4. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable controlling element freely movable between said nozzles to receive upon its opposite faces fluid jets from the nozzles whereby the forces of said jets upon the element are substantially balanced, means to effect an adjustment between the controlling element and the nozzles to change the rate of cut-off and maintain the mean point of cut-off of the controlling element, and a responsive device oscillating said controlling element between the nozzles to cut off substantially thereby the jets of fluid normally discharged therefrom and actuate the pilot valve.

5. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable controlling element freely movable between said nozzles to receive upon its opposite faces fluid jets from the nozzles whereby the forces of said jets upon the element are substantially balanced, means to effect an angular adjustment between the controlling element and nozzles to change the rate of cut-off and maintain the mean point of cut-off of the controlling element, and a responsive device oscillating said controlling element between the nozzles to cut off substantially thereby the jets of fluid normally discharged therefrom and actuate the pilot valve.

6. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable controlling element freely movable between said nozzles, to receive upon its opposite faces fluid jets from the nozzles whereby the forces of said jets upon the element are substantially balanced and having a cut-off edge of contour with references to the nozzle such as to graduate the rate of cut-off of the controlling element, and a responsive device oscillating said controlling element between the nozzles to cut off substantially thereby the jets of fluid normally discharged therefrom and actuate the pilot valve.

7. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable vane freely movable between the nozzles and with cut-off edge inclined a variable amount relatively to the longitudinal axis of the vane to afford the degree of cut-off desired, and a responsive device oscillating said controlling element between the nozzles to cut off substantially thereby the jets of fluid normally discharged therefrom and actuate the pilot valve.

8. In controlling apparatus for means utilizing a fluid, and a pilot valve to control the supply of fluid to be utilized: means to operate the pilot valve and embodying two opposed nozzles permanently in communication with a source of fluid supply and with the pilot valve, an oscillatable vane freely movable between the nozzles and of a wedge shape with downwardly directed cut-off edge, and a responsive device oscillating said controlling element between the nozzles to cut off substantially thereby the jets of fluid normally discharged therefrom and actuate the pilot valve.

In testimony whereof we affix our signatures.

HENRY L. GRIGGS.
ARTHUR R. MABEY.